No. 725,853. PATENTED APR. 21, 1903.
L. LEVIN.
VEHICLE BRAKE OR LOCK.
APPLICATION FILED OCT. 27, 1902.
NO MODEL. 2 SHEETS—SHEET 1.

Witnesses

Inventor
L. Levin
By H. B. Willson & Co.
Attorneys

THE NORRIS PETERS CO., PHOTO-LITHO., WASHINGTON, D. C.

No. 725,853. PATENTED APR. 21, 1903.
L. LEVIN.
VEHICLE BRAKE OR LOCK.
APPLICATION FILED OCT. 27, 1902.
NO MODEL. 2 SHEETS—SHEET 2.
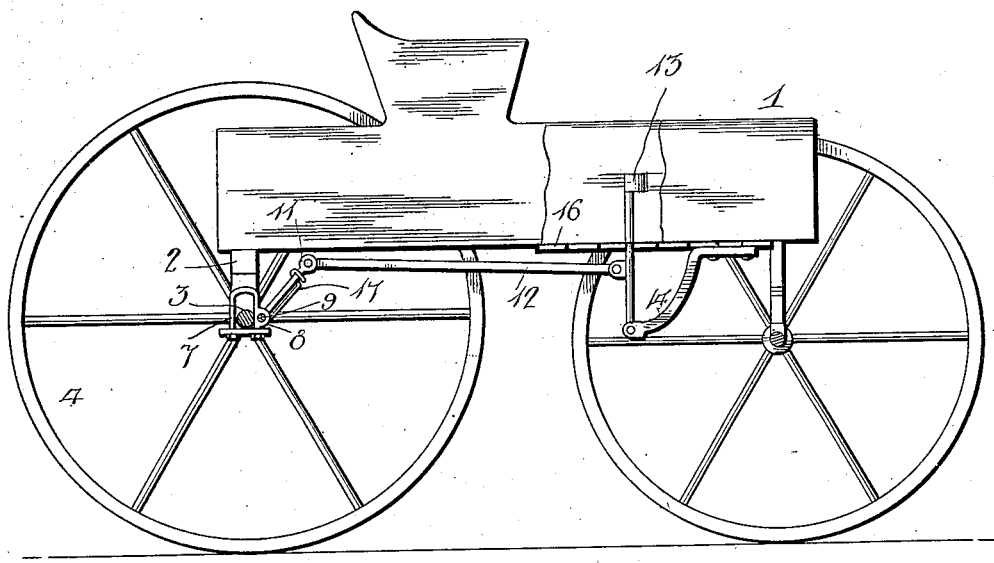
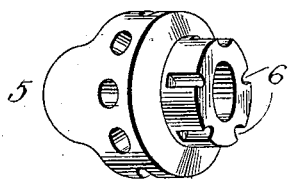
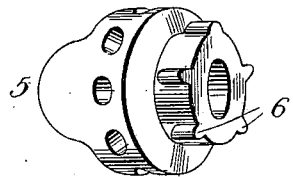

UNITED STATES PATENT OFFICE.

LEWIS LEVIN, OF NEWCASTLE, PENNSYLVANIA.

VEHICLE BRAKE OR LOCK.

SPECIFICATION forming part of Letters Patent No. 725,853, dated April 21, 1903.

Application filed October 27, 1902. Serial No. 128,982. (No model.)

*To all whom it may concern:*

Be it known that I, LEWIS LEVIN, a citizen of the United States, residing at Newcastle, in the county of Lawrence and State of Pennsylvania, have invented certain new and useful Improvements in Vehicle Brakes or Locks; and I do declare the following to be a full, clear, and exact description of the invention, such as will enable others skilled in the art to which it appertains to make and use the same.

This invention relates to vehicle-brakes, and particularly to brakes for vehicles of the lighter varieties, such as buggies, &c.

The object is to provide a hub brake or lock which is simple of construction and durable and efficient in use and capable of being equally well applied to new buggies as to buggies already in use.

With these and other objects in view the invention consists in certain novel features of construction, combination, and arrangement of parts, as will be hereinafter more fully described, and particularly pointed out in the appended claim.

Figure 1:
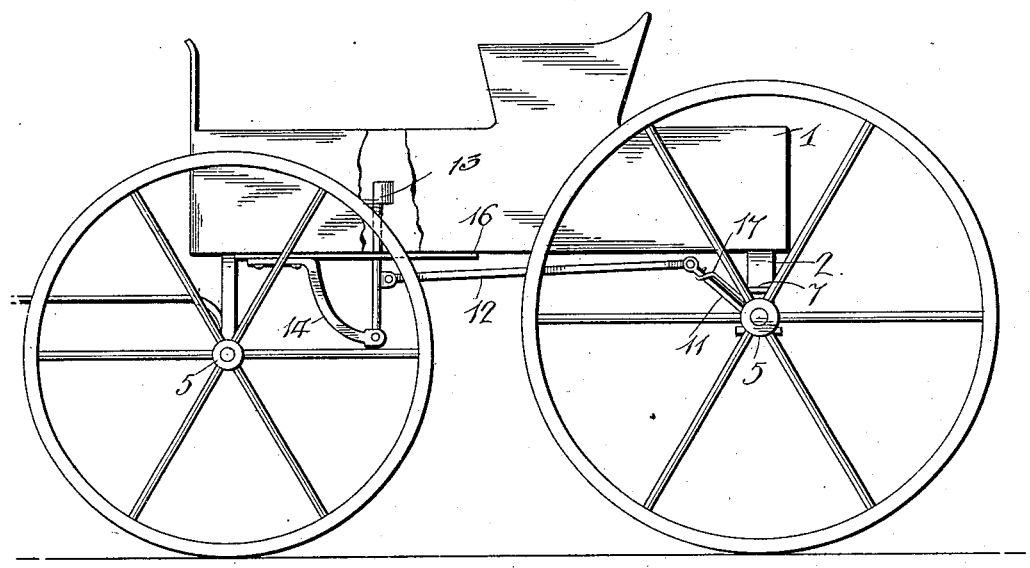
Figure 2:
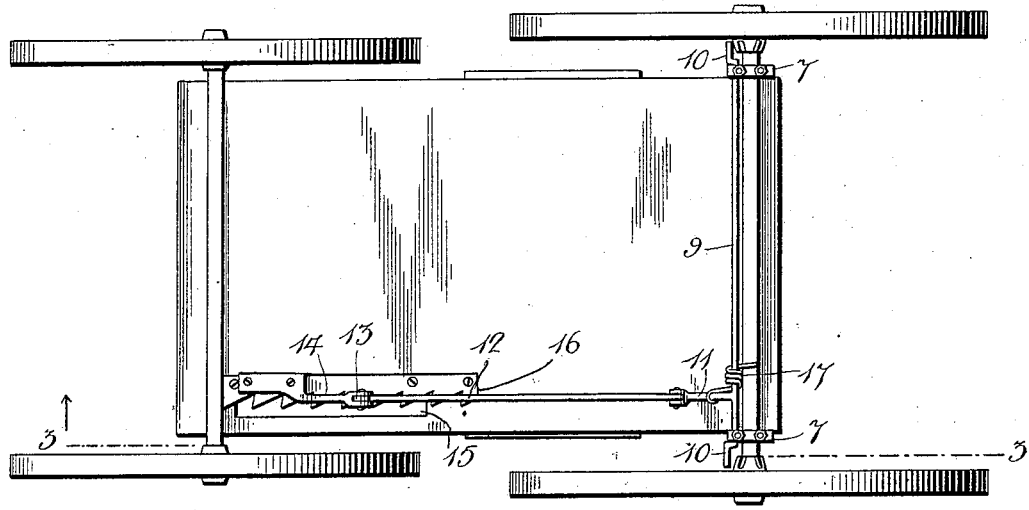

In the accompanying drawings, Figure 1 is a side elevation of a buggy equipped with my invention. Fig. 2 is a bottom plan view thereof. Fig. 3 is a section on line 3 3 of Fig. 2; and Figs. 4 and 5 are perspective views of vehicle-hubs, showing different forms of locking-surfaces.

Referring now more particularly to the drawings, the numeral 1 represents the body of a vehicle of the character described, 2 the rear bolster, and 3 the rear axle, upon which latter are mounted the rear wheels 4.

In accordance with my invention the inner ends or extensions of the hubs 5 of the rear wheels are provided with locking-surfaces 6, formed either by recessing said extensions at regular intervals, as shown in Fig. 4, or providing the same with projecting shoulders, as shown in Fig. 5, said recesses or shoulders being formed directly in or upon such extensions or upon a metallic cap applied thereto, as may be desired or found most practical in use.

To the rear axle are applied clips 7, which have journals 8, in which are mounted the ends of a rock-shaft 9, which shaft is provided with angularly-bent locking extensions 10, adapted when the shaft is adjusted in one position to engage the said recesses or shoulders of the hub extensions and lock the rear wheels of the vehicle against movement. The shaft is provided with a crank-arm 11, which is connected with one end of a rod 12, which extends forwardly and is pivotally attached at its front end to an operating-lever 13, the said operating-lever being pivoted at its lower end to a bracket 14, secured to the under side of the body and thence projecting upwardly into the body through a slot 15 formed therein, so that its upper end will be in convenient reach of the occupant of the vehicle from the seat, enabling said occupant to move the lever forward to apply the brake or rearward to release it. The lever is adapted to engage the teeth of a rack-plate 16, secured to the under side of the body, whereby it may be locked in either of its adjusted positions.

The retracting-spring 17 is coiled about the rock-shaft and has one end bearing upon the under side of the axle and its other end engaging the crank, by means of which it is mounted in such manner as to exert pressure on such crank to normally throw it upward, and thereby move the locking extensions of the axle out of engagement with the hubs of the wheels. When the operating-lever is thrown forward, the crank is moved downward against the tension of this spring and rocks the shaft to throw the locking extensions into engagement with the hubs, whereupon by connecting the operating-lever with the rack the vehicle may be held locked or braked for any period desired. When the lever is disengaged from the rack and moved rearwardly, the reaction of the spring forces the crank upward again and rocks the shaft reversely, so as to move the locking extensions out of engagement with the hubs, leaving the rear wheels free to revolve.

From the foregoing description, taken in connection with the accompanying drawings, the construction, mode of operation, and advantages of the invention will be apparent, and it will be seen that a simple and effective braking mechanism for light vehicles is provided and that the device is readily applicable to new vehicles or to those already built or in use.

Various changes in the form, proportion, and the minor details of construction may be resorted to without departing from the principle or sacrificing any of the advantages of this invention.

Having thus fully described my invention, what I claim as new, and desire to secure by Letters Patent, is—

In a brake for buggies and other light wheeled vehicles, the combination with a vehicle-body provided in its bottom with a longitudinal slot, a rear axle, and wheels mounted thereon and provided with rack-toothed hubs, of a rack-bar secured to the body parallel with and on one side of said slot and having its rack-teeth projecting into the plane of the slot, a rock-shaft having pawls to engage the hubs and adapted when engaged to lock the wheels against either forward or backward movement, and also having a crank-arm normally projecting upwardly and forwardly at an angle to the horizontal, a spring coiled intermediately about the shaft and having one end bearing on the axle and the other end engaging and holding the crank-arm in the stated position, a bracket secured to the under side of the body and projecting beneath the slot, a lever fulcrumed to the bracket and projecting upward through the slot into the vehicle-body and adapted to be locked in adjusted position by the rack, and a link or connecting-rod connecting the lever with the crank-arm, whereby when the lever is moved forward the crank-arm will be drawn downward against the resistance of said spring to rock the shaft to throw the pawls into locking engagement with the hubs, substantially as described.

In testimony whereof I have hereunto set my hand in presence of two subscribing witnesses.

LEWIS LEVIN.

Witnesses:
W. W. CUBBISON,
JAS. D. LOWERY.